United States Patent [19]

Jensen

[11] Patent Number: 4,920,274
[45] Date of Patent: Apr. 24, 1990

[54] METERING APPARATUS AND METHOD FOR THE MEASUREMENT OF A FIXED LENGTH OF CONTINUOUS YARN OR STRAND

[75] Inventor: Thomas H. Jensen, Murrysville, Pa.

[73] Assignee: PPG Industries, Inc., Pittsburgh, Pa.

[21] Appl. No.: 331,765

[22] Filed: Apr. 3, 1989

[51] Int. Cl.⁵ .................. G01N 21/86; G01V 9/04
[52] U.S. Cl. ................................ 250/561; 33/736; 242/39
[58] Field of Search ............... 33/736, 734, 735; 250/561; 242/36, 39; 384/100, 112, 114

[56] References Cited

U.S. PATENT DOCUMENTS

| | | | |
|---|---|---|---|
| 3,068,579 | 12/1962 | Newman | 33/134 |
| 3,251,562 | 5/1966 | Petersen | 242/39 |
| 3,860,185 | 1/1975 | Makino et al. | 242/36 |
| 3,988,879 | 11/1976 | Franzolini et al. | 57/265 |
| 4,217,695 | 8/1980 | Chapman et al. | 33/736 |
| 4,447,955 | 5/1984 | Stutz et al. | 33/129 |
| 4,715,550 | 12/1987 | Erni et al. | 242/39 |

Primary Examiner—David C. Nelms
Assistant Examiner—George C. Beck
Attorney, Agent, or Firm—Richard E. Maebius

[57] ABSTRACT

This invention presents both a method and device capable of accurately measuring fixed lengths of moving strand or yarn as it is pulled from an essentially continuous source of supply and wound onto a take-up reel by an appropriately powered winding mechanism. In its preferred embodiment, the invention is used to measure lengths of fiberglass strand unwound from forming packages and onto rotating bobbins carried on a twist frame. As its principal component, the invention utilizes a lightweight, low inertia measuring rim supported on a layer of pressurized gas, such as air, so that frictionless rotation of the rim about a stationary hub is thereby made possible. Moving strand is maintained in continuous contact with the rim thereby causing it to rotate. The number of rotations is counted by electrical means and multiplied by the circumference of the rim whereby the length of strand advanced over the rim and onto the rotating bobbin is calculated.

19 Claims, 3 Drawing Sheets

METERING APPARATUS AND METHOD FOR THE MEASUREMENT OF A FIXED LENGTH OF CONTINUOUS YARN OR STRAND

BACKGROUND OF THE INVENTION

This invention relates to an apparatus and methods for the accurate measurement of fixed lengths of yarn or strand while they are wound onto a take-up reel from an essentially continuous supply source. In particular, the invention pertains to an apparatus and methods for the accurate measurement of lengths of fiber glass yarn or strand wound onto bobbins from forming packages rotating on a twist frame.

For quality control purposes, it is desirable that every bobbin carrying similarly sized yarn or strand (hereinafter called "strand") also contain the same length thereon so that yardage variations among a group of randomly selected bobbins is as small as possible. This is important in the manufacture of fabricated products by customers who use bobbins, for example, to make a beam for the production of woven fabric. The early run-out of one bobbin where several are used in forming a beam will interrupt the production process while a new bobbin is spliced in. Such interruptions are inefficient and costly to a fabric manufacturer.

In commercial applications, it has been common practice in the textile industry to wind as many as 100 or more bobbins on a single twist frame. Each bobbin is fed by a single forming package placed on an individual feed roll or creel. The creels are often driven by means of a common drive mechanism from which they may be independently disengaged. Other twist frames may contain creels that are individually driven. Likewise, the bobbins may be driven individually or through a common drive mechanism. As strand is unwound from each forming package and onto its corresponding bobbin, a twist is usually imparted by means of a rotating traveler.

One method which has been used in the past to measure the length of strand wound onto the bobbin is to simply count the number of revolutions of the forming package or those of the bobbin. This approach, while attractive, is subject to significant error since the effect of forming package shape and buildup of yarn on the bobbin is not taken into consideration. A second method of insuring that each bobbin carries the same length of yarn is to simply run each forming package/bobbin pair for a fixed period of time and rely upon the consistency of each forming package to produce bobbins of uniform yarn length. Still yet, another method by which to more accurately measure the length of yarn wound onto the bobbin is to bring the moving strand in contact with the periphery of a rotatable disc or rim of known diameter as the strand is unwound from the forming package. As the strand advances, the tractive force between it and the rim will cause the rim to rotate so long as contact is maintained. Ideally, the tangential velocity of the rim will equal the lineal velocity of the strand and, therefore, each revolution of the rim will measure off a length of strand equal to its circumference. By counting the number of revolutions of the rim and then multiplying by its circumference, one can determine the total length of strand that has been advanced past the rim and onto the bobbin.

In the case of fine strands, several problems must be overcome in order to use this latter technique. Often, it is necessary to maintain a low axial tension in the strand to prevent breakage and other adverse effects during the twisting process. Another problem involves accurately tracking the motion of the strand so as to minimize the relative slip between it and the rotating rim in order to reflect variations in strand velocity.

As will now be shown, the instant invention minimizes or overcomes entirely most of the problems faced by prior art devices.

SUMMARY OF THE INVENTION

In accordance with this invention, a method and device capable of accurately measuring fixed lengths of moving strand pulled from an essentially continuous strand supply and wound onto a take-up reel by a powered winding mechanism is provided. Measurement of the strand is accomplished by maintaining continuous contact between it and the periphery of a lightweight, low inertia rotatable rim of known diameter whereby the rim is caused to rotate about essentially a frictionless surface. The number of rotations are electronically counted and multiplied by the circumference of the rim. Ideally, the resulting value is equal to the total length of strand which has come in contact with the rim in order to produce the number of revolutions counted.

In one embodiment, the invention may be used to measure the length of strand unwound from a forming package and onto a textile bobbin by way of a twist frame. In another embodiment, the invention may be used to measure the length of several strands unwound from a plurality of forming packages held on a creel and wound onto a roving tube by way of a mandrel. In yet another embodiment, the invention may be used to measure the length of glass strand pulled from a fiber glass bushing and wound directly onto a forming package.

In order to accomplish these various embodiments, several objectives that overcome the problems and limitations experienced in the prior art are achieved. Therefore, it is one object of this invention to provide for the accurate measurement of lengths of very fine textile filaments. It is another object of this invention to provide for the accurate measurement of lengths of strand while not inducing any substantially greater tension in the strand than is already present. It is a further object of this invention to maintain the strand in continuous contact with a rotating rim so that essentially errors in the measurement of strand length are minimized. It is, yet, a further object of this invention that the rim be able to respond rapidly to any fluctuation in strand velocity so as to minimize the potential for any relative slip between it and the strand.

As will become apparent from the remainder of the disclosure, the claimed invention adequately meets these objectives and overcomes the limitations of the prior art by utilizing a lightweight, low inertia metering rim supported on a layer of pressurized gas so that frictionless rotation of the rim is thereby made possible.

DETAILED DESCRIPTION OF THE INVENTION

Figure 1:
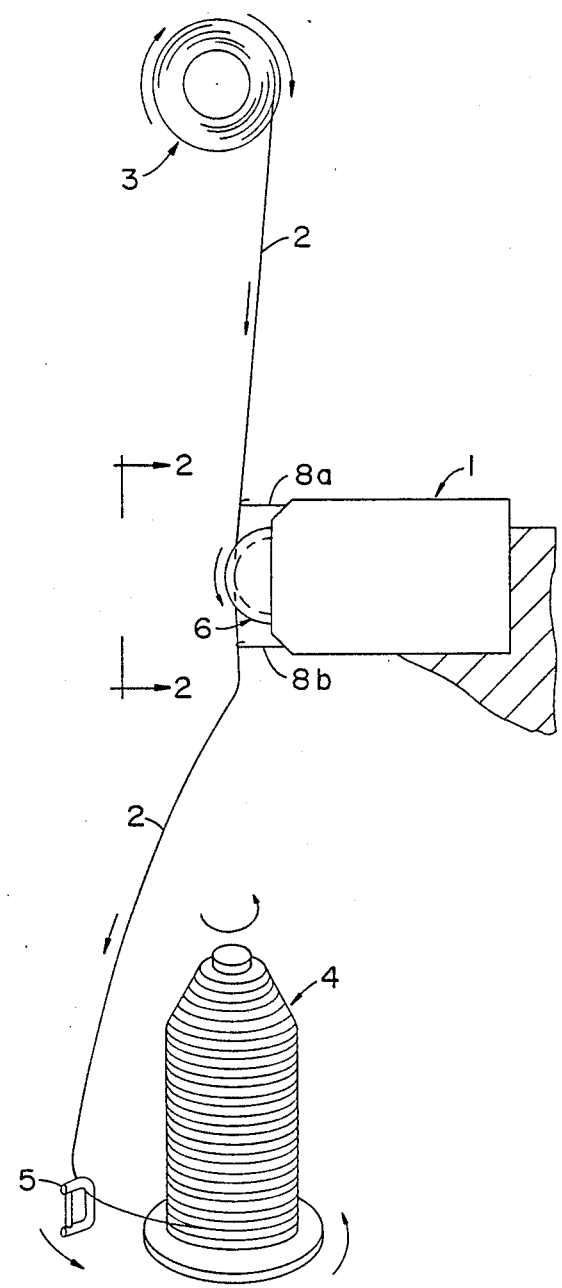
FIG. 1 shows a general schematic of the preferred embodiment of the invention as it would be used in the operation of a twist frame.

Referring to the drawings, FIG. 1 depicts schematically the preferred embodiment of the invention. A suitably supported metering apparatus (1) is used to measure the length of strand (2) unwound from a forming package (3) onto a bobbin (4) by means of a traveling ring (5) as it would be done on a twist frame. Although in the preferred embodiment, the apparatus and methods are described as used in a twist frame environment, it will be understood that the apparatus and methods are not limited thereto. For example, the means for supplying an essentially continuous source of strand to the take-up reel may encompass means to feed a plurality of strand from many forming packages held on a creel and gathered into a single, much larger strand, usually referred to as roving. This roving yarn is then subsequently wound onto a tube carried on an appropriately powered rotating mandrel. Similarly, a continuous source of strand may be supplied from an operating fiberglass bushing wherein individual filaments drawn from the bushing are gathered into strands which are wound onto a forming tube carried by an appropriately powered rotating winder.

Returning to FIG. 1, as the strand (2) is unwound from the supply source (3) and onto the take-up reel (4), it is brought into contact with the periphery of a rotatable rim (6) housed inside the measuring apparatus (1). Continuous contact is maintained by passing the strand through at least two adjustable strand guides (8a and 8b) arranged such that the strand passing through them is deflected from the vertical and pulled inwardly toward the rim so that the moving strand is held in continuous contact against an arc of the circumference of the rim (6).

Figure 2:
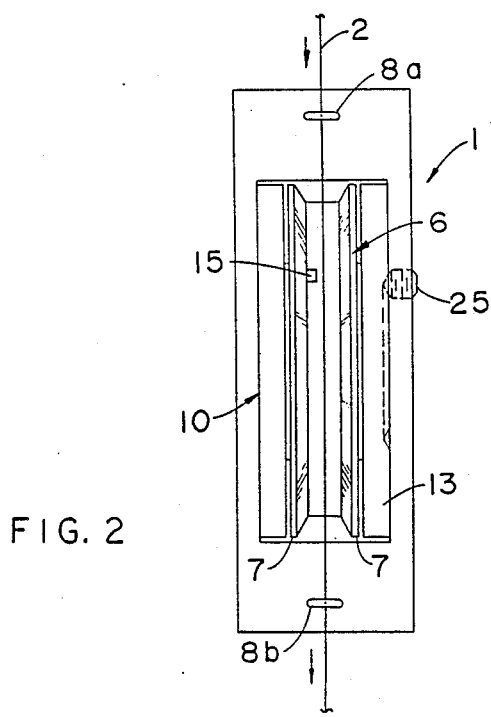
FIG. 2 shows a front elevation of the measuring device of FIG. 1 taken along line 2—2.
Figure 3:
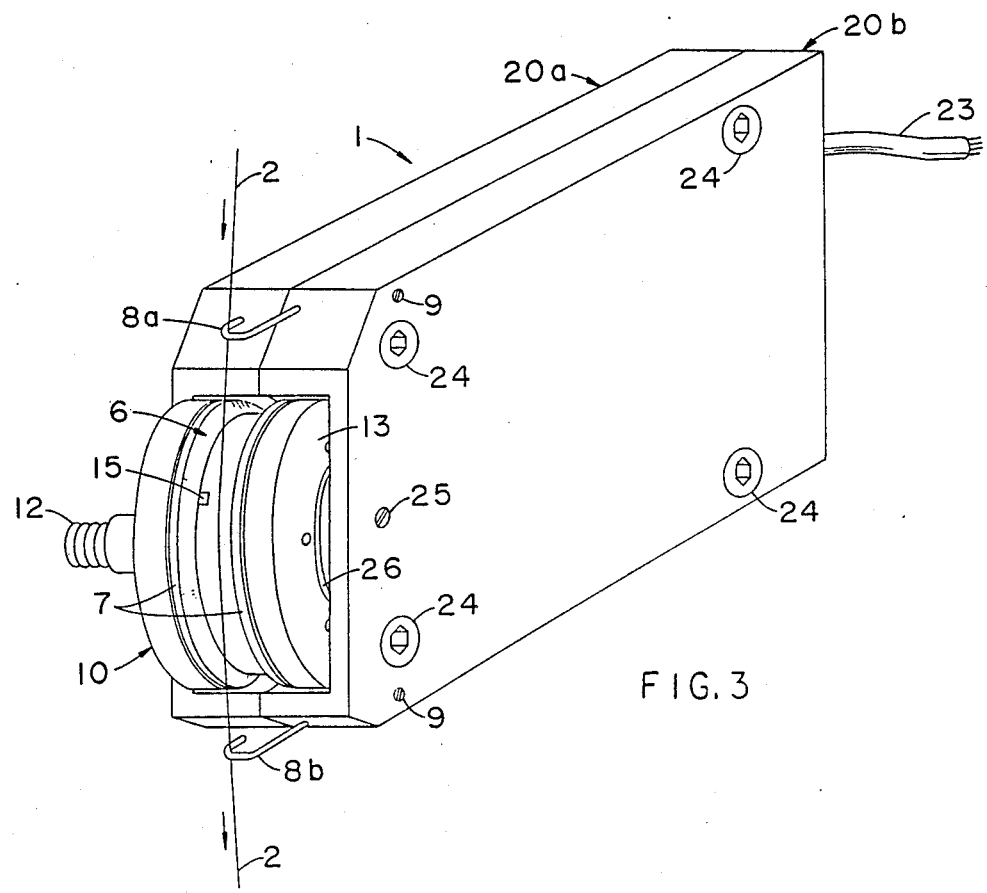
FIG. 3 is a perspective view of the assembled measuring device shown in FIG. 2
Figure 4:
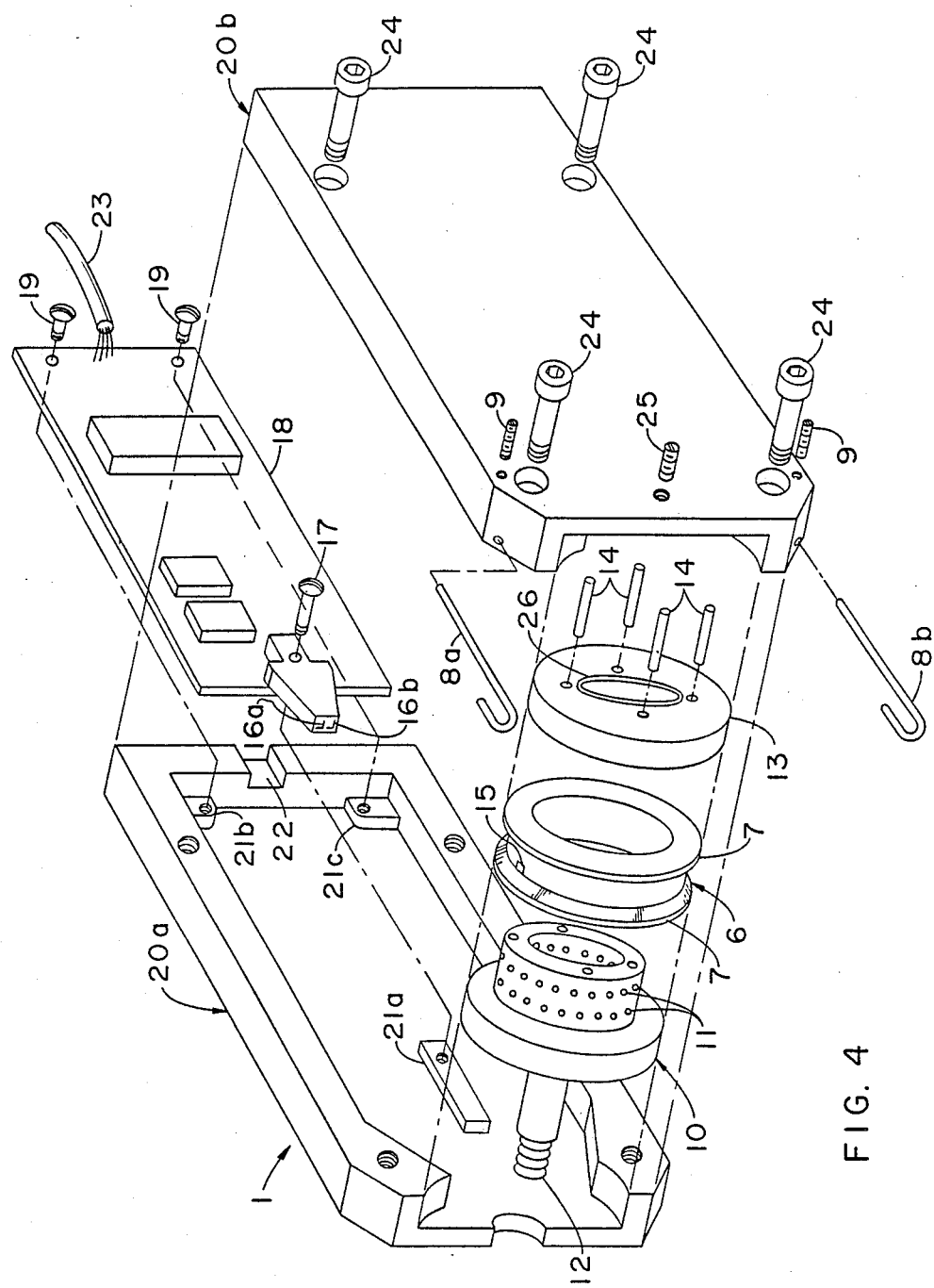
FIG. 4 is an exploded perspective view of the measuring device showing its internal and external components.

The adjustable strand guides (8a and 8b) are further illustrated in FIGS. 2-4. In the preferred embodiment, they are generally made of brass, preferably free machining brass, although any material resistant to the cutting action of glass and which does not itself adversely affect the yarn may be used. The guides are bent at one end in the shape of a hook, "J", eye, pigtail or some other open configuration so that the strand (2) can be easily inserted and passed through them. The other end of the strand guides are inserted into holes located in one side of the separable housing (20b), positioned and then secured by means of a set screw, hex nut or other conventional threaded fastener (9) inserted at a right angle to guide. The guides may be further adjusted by bending them so that the strand (2) contacts the rim (6) and divides it along its midplane as illustrated in FIGS. 2 and 3.

The metering rim (6) illustrated in FIG. 4 is an annular member formed from a single piece of lightweight polyurethane by either a machining or molding process. In the preferred embodiment, the rim contains raised lips (7) at each end which extend radially so that a flat track or raceway for containing the strand is thereby formed between them as illustrated in FIG. 2. Although a rim having such a track or raceway is preferred, one having an entirely flat surface may also be employed provided the strand can be maintained in contact with it.

Turning to FIG. 4, the rim (6) is concentrically mounted over the upper annular portion of a hub (10). The walls of the annulus contain a plurality of uniformly spaced holes (11) of fine diameter oriented toward the centerline. The base of the hub (10) consists of a solid disc having an outside radius greater than that of the annulus. In the preferred embodiment the hub (10) was machined from a single piece of material although the invention also contemplates a hub (10) being constructed from at least two separately manufactured parts as well as a single molded unit requiring minimal further fabrication or machining.

A nozzle (12) is provided through the base of the hub (10) for the injection of a substantially continuous supply of pressurized gas such as air. In the preferred embodiment, the nozzle is a commercially available fitting. A hole is drilled through the base along the centerline of the hub (10) and threaded so as to receive one end of the fitting. A hose carrying pressurized gas is then attached to the nozzle and the gas enters the interior of the annulus. This is not the only manner by which a pressurized gas can be supplied to hub and all other similar variations, including one in which the hub (10) and nozzle (12) are formed from a single piece of material are also contemplated.

A round end cap (13) is provided along with means (14) for securing it to the face of the annular portion of the hub (10), the end cap having substantially the same radius as the base of the hub. The end cap may be secured in place by means such as conventional threaded fasteners but the use of glue, adhesives, and possibly heat bonding is also contemplated.

At one location on the outer face of the rim (6), there is bonded a light reflective target (15) in the shape of a dot or stripe made from a material such as thin aluminum foil. Both a light emitting diode (16a) and phototransistor (16b), the operation of which will be described below, are housed in a single casing mounted along with a printed circuit board (18) and electrical components, also described below, by a conventional threaded fastener (17). At least two other conventional threaded fasteners (19) are provided to secure the printed circuit board (18) and its associated electrical components inside one-half of a separable housing (20a). The housing is of such a construction that it is capable of receiving the threaded fasteners (19) at bored and tapped locations (21a, 21b, and 21c). The housing further contains an access hole or port (22) through which to pass a plurality of electrical wires or cables (23) carrying electrical signals used to turn off or on the drive motors of the twist frame, mandrel, or other powered winding means used to advance the strand.

The bearing assembly comprising the hub (10), rim (6), and end cap (13) is inserted at the front of the housing (20a) and the other corresponding half (20b) is positioned in place as indicated in FIG. 4. A plurality of conventional threaded fasteners (24) are then used to secure the two halves of the housing together. The base of the hub (10) and end cap (13) are pressed in position against at least four support surfaces in the housing, all having the same radius as the base of the hub (10) and end cap (13). A conventional threaded fastener, such as a set screw (25), is then inserted through one side of the housing (20b) and tightened so as to engage a diametral groove (26) cut in the end cap (13) whereby the bearing assembly is securely held in place.

In its preferred embodiment, operation of the assembled apparatus is accomplished by connecting a source of compressed air having a pressure of between 70 and 90 psi to the nozzle (12). Due to the presence of the end cap (13), the air expands radially through the holes (11) in the wall of the annular portion of the hub (10) whereupon it pushes against the inside face of the rim (6). The holes (11) are very fine, typically on the order of 0.018 inches in diameter. In the preferred embodiment, two rows of eight uniformly spaced and alternating holes were used as depicted in FIG. 4.

The pressure of the air lifts the rim (6) from the hub (10) and maintains it in a substantially concentric position about the annular portion thereof. Moving strand is then brought in contact with the rim thereby causing it to rotate essentially without friction and in a substantially concentric manner about the hub.

Should the rim be displaced from concentric rotation, a restoring force will be generated due to the creation of an imbalance in the circumferential pressure distribution of the gas supporting the rim. This imbalance will increase as the rim is displaced further and further from concentric rotation about the hub. As it does, so too will be the restorative force which acts to push the rim back into position. Thus, the combined action of the pressure imbalance and restorative force continually maintains the position of the rim.

As an example, in the preferred embodiment a rim constructed of polyurethane having a density of approximately 0.04 lb/in$^3$ weighs about 4.3 grams. The rim itself (6) has an inside diameter of 1.750 inches and an outside diameter of 1.820 inches at the raceway which comes in contact with the strand. Neglecting the effect of the lips (7), a rim such as this will have a moment of inertia about its axis on the order of $2.0 \times 10^{-6}$ lb-ft-sec$^2$. A strand moving at a typical lineal velocity of between 600 and 700 feet per minute and contacting the flat will cause the rim to rotate at an angular velocity between 137 and 160 radians per second or roughly 1300 to 1500 rpm.

Light emitted from the diode (16a) is reflected by the target (15) carried on the rim (6) and this reflected light is then sensed by the phototransistor (16b) whereupon a pulse of electrical current is generated and converted into a voltage pulse once during each revolution of the rim. This voltage is then used to trigger a monostable timing circuit which produces a corresponding voltage pulse having a known magnitude and duration that is compatible with existing microcomputers.

In the preferred embodiment, the light emitting diode and phototransistor are combined and housed in a single commercially available unit such as Model OPB-703A, which is manufactured by TRW Corporation. A commercially available timing circuit such as type NE555, manufactured by Signetics Corporation, and a microcomputer such as type 8751, manufactured by Intel Corporation, may be used although other equivalent components may be substituted to accomplish the same results.

The microcomputer counts the number of voltage pulses which, in turn, correspond to the number of revolutions of the rim and may further be programmed to calculate the total strand length by multiplying this number by the rim's circumference. As the rim rotates, these pulses will occur with a periodicity corresponding to the frequency of rotation of the rim.

The microcomputer may also be programmed to activate a relay circuit in order to interrupt the powered winding means once a target count or preset strand length is achieved.

The target count, actual count, and other operating parameters such as the diameter of the measuring rims may be transmitted to and from the microcomputer by any commercially available serial communications interface circuit such as MAX232 manufactured by MAXIM Corporation.

Several alternative embodiments of the invention have now been disclosed including the preferred embodiment in which certain specific aspects of the apparatus have been described. It should be understood that this invention is in no way limited to the use of specific materials, electrical devices, or dimensions whenever others may be substituted to accomplish the same result.

I claim:

1. An apparatus for measuring strand as it is wound from a strand source onto a take-up reel comprising:
   (a) means for supplying strand to the take-up reel from the strand source;
   (b) an electrically controlled and appropriately powered winding means operatively connected between the strand source and the take-up reel so as to engage the strand and cause it to move in a path from the strand source and onto the take-up reel;
   (c) means for guiding the advancing strand between the strand source and the take-up reel;
   (d) a pressurized gas bearing positioned between the strand source and the take-up reel and with respect to the moving strand so that the strand contacts a rotatable metering rim on the pressurized gas bearing thereby causing the rim to rotate, said rim being concentrically mounted about a stationary hub, said hub having means therein for the introduction and exit of a pressurized gas so that an essentially frictionless layer of pressurized gas fills the annular region between said hub and rim thereby allowing said rim to rotate with essentially zero friction; and
   (e) a first electrical circuit means for detecting, counting, and storing the number of revolutions of the rim when it is caused to rotate.

2. The apparatus of claim 1 further including a second electrical circuit means for preselecting a number of revolutions and comparing the revolutions detected with the preselected value.

3. The apparatus of claim 2 further including a third electrical circuit means for disengaging the electrically controlled winding means when the preselected number of revolutions are achieved.

4. The apparatus of claim 1 wherein the first electrical circuit for detecting the number of revolutions includes:
   (a) a light emitting diode;
   (b) a phototransistor; and
   (c) a light reflective target affixed to the surface of the rotatable metering rim whereby light reflected from the diode and sensed by the phototransistor is converted into an electrical pulse, each pulse representing one revolution of the rim.

5. An apparatus for measuring strand as it is wound onto a take-up reel comprising:
   (a) means for supplying a source of strand to the take-up reel;
   (b) an electrically controlled and appropriately powered winding means operatively connected between the supply of strand and the take-up reel so as to engage the strand and cause it to move in a path from the source and onto the take-up reel;
   (c) a one-piece hub having an upper annulus and lower base, the radius of the base being greater than the outside radius of the annulus, the annulus having a plurality of fine holes through its wall;
   (d) a metering rim of lightweight material having an inside radius slightly greater than that of the annulus and being concentrically mounted thereon, the rim also having a lip projecting radially outward at each end;

(e) a solid end cap having the same radius as the base of the hub;

(f) means for securing the end cap flat against the top of the annulus so as to permit the concentrically mounted rim to rotate thereon;

(g) means for continuously admitting a pressurized gas through the base of the hub whereby the gas escapes through the holes in the wall of the annulus and pushes radially outward against the inside surface of the concentrically mounted rim thereby causing the rim to expand slightly and allow it to rotate about the hub on a layer of pressurized gas with essentially zero friction;

(h) means for guiding the path of the moving strand so as to bring it in contact with the rim thereby causing it to rotate;

(i) a first electrical circuit means for detecting, counting, and storing the number of revolutions of the rim.

6. The apparatus of claim 5 further including a second electrical circuit means for preselecting a number of revolutions and comparing the current number of revolutions with the preselected value.

7. The apparatus of claim 6 further including a third electrical circuit means for disengaging the electrically controlled and appropriately powered winding means when the preselected number of revolutions is achieved.

8. The apparatus of claim 5 wherein the first electrical circuit means for detecting the number of revolutions includes:

(a) a light emitting diode;

(b) a phototransistor; and (c) a light reflective target affixed to the surface of the rotatable rim, whereby light reflected from the diode and sensed by the phototransistor is converted into an electrical pulse, each pulse representing one revolution of the rim.

9. A method for measuring a length of strand as it is wound onto a take-up reel comprising the steps of:

(a) winding the strand onto a take-up reel by an electrically controlled and appropriately powered winding mechanism which causes the strand to be set in motion;

(b) contacting the moving strand against the surface of a circular metering rim thereby causing it to rotate about a hub with substantially the same tangential velocity as the moving strand, said rim being concentrically mounted about a stationary hub, said hub having means therein for the introduction and exit of a pressurized gas so that an essentially frictionless layer of pressurized gas fills the annular region between said hub and rim thereby allowing said rim to rotate with essentially zero friction;

(c) counting the number of revolutions of the rim by electro-optical means; and (d) discontinuing the winding of the strand once a predetermined number of revolutions has been counted.

10. The method of claim 9 wherein the strand is unwound from a forming package carried on a textile twist frame and taken up by a rotating bobbin.

11. The method of claim 9 wherein the strand is composed from a plurality of similar strands, each being unwound from an equal number of forming packages held by a creel and gathered into a single roving yarn and wound onto a tube by a rotating mandrel.

12. A method for measuring strand as it is drawn from a fiber glass bushing and wound onto a rotating tube carried by an appropriately powered winder comprising the steps of:

(a) contacting the moving strand against the surface of a circular metering rim thereby causing it to rotate about a hub with substantially the same tangential velocity as the moving strand, said rim being concentrically mounted about a stationary hub, said hub having means therein for the introduction and exit of a pressurized gas so that an essentially frictionless layer of pressurized gas fills the annular region between said hub and rim thereby allowing said rim to rotate with essentially zero friction;

(b) counting the number of revolutions of the rim by electro-optical means; and (c) discontinuing the winding of the strand once a predetermined number of revolutions has been counted.

13. The apparatus of claim 1 wherein said pressurized gas is pressurized air.

14. The apparatus of claim 3 wherein said pressurized gas is pressurized air.

15. The apparatus of claim 4 wherein said pressurized gas is pressurized air.

16. The apparatus of claim 7 wherein said pressurized gas is pressurized air.

17. The apparatus of claim 8 wherein said pressurized gas is pressurized air.

18. The method of claim 11 wherein said pressurized gas is pressurized air.

19. The method of claim 12 wherein said pressurized gas is pressurized air.

* * * * *